(12) United States Patent
Tsai et al.

(10) Patent No.: US 12,174,773 B2
(45) Date of Patent: Dec. 24, 2024

(54) TRANSMISSION CONTROL ARCHITECTURE BETWEEN SENSING DEVICE AND HOST DEVICE

(71) Applicant: Realtek Semiconductor Corp., HsinChu (TW)

(72) Inventors: Chung-Hang Tsai, HsinChu (TW); Yi-Ching Yeh, HsinChu (TW); Jack Lee, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/571,559

(22) Filed: Jan. 10, 2022

(65) Prior Publication Data

US 2022/0237140 A1    Jul. 28, 2022

Related U.S. Application Data

(60) Provisional application No. 63/142,967, filed on Jan. 28, 2021.

(30) Foreign Application Priority Data

Oct. 18, 2021 (TW) .................................. 110138521

(51) Int. Cl.
*G06F 13/40* (2006.01)
*G06F 13/38* (2006.01)
*G06F 13/42* (2006.01)

(52) U.S. Cl.
CPC ........ *G06F 13/4068* (2013.01); *G06F 13/385* (2013.01); *G06F 13/4282* (2013.01)

(58) Field of Classification Search
CPC ............. G06F 13/4068; G06F 13/4282; G06F 13/4291; G06F 13/385; G06F 13/387;
(Continued)

(56) References Cited

U.S. PATENT DOCUMENTS 6,175,882 B1 *   1/2001   Bunton ............... G06F 13/4291
                                                                 327/39
11,134,324 B2 *  9/2021   Lesso ...................... H04R 1/08
(Continued)

FOREIGN PATENT DOCUMENTS

WO        2017/200704 A1    11/2017

*Primary Examiner* — Idriss N Alrobaye
*Assistant Examiner* — Richard B Franklin
(74) *Attorney, Agent, or Firm* — Winston Hsu (57) ABSTRACT

A sensing device includes a sensed information transmitting circuit, a control information slave circuit and a mode switching circuit. The sensed information transmitting circuit converts sensed information into a transmission signal compliant with a signal format of a first transmission protocol. The control information slave circuit converts a received signal received from a signal transmission interface into control information according to a second transmission protocol, thereby to configure the sensing device. The mode switching circuit to activates one of the sensed information transmitting circuit and the control information slave circuit based on a signal on a clock channel of the signal transmission interface, a signal on a data channel of the signal transmission interface or a signal on a power rail of the sensing device, thereby to transmit or receive signals through the signal transmission interface.

16 Claims, 5 Drawing Sheets

(58) Field of Classification Search
CPC ....... H04L 7/0087; H04L 5/22; H04L 7/0008; H04L 25/4902; H04L 67/12
See application file for complete search history.

(56) References Cited

U.S. PATENT DOCUMENTS

| | | | |
|---|---|---|---|
| 2012/0110218 A1* | 5/2012 | Josefsson | G06F 11/3485 710/18 |
| 2016/0105750 A1* | 4/2016 | Cagdaser | H04R 3/00 381/174 |
| 2020/0267295 A1 | 8/2020 | Lee | |

\* cited by examiner

TRANSMISSION CONTROL ARCHITECTURE BETWEEN SENSING DEVICE AND HOST DEVICE

CROSS REFERENCE TO RELATED APPLICATIONS

This application claims the benefit of U.S. Provisional Application No. 63/142,967, filed on Jan. 28, 2021. The content of the application is incorporated herein by reference.

BACKGROUND OF THE INVENTION

1. Field of the Invention

The present invention relates to signal transmission, and more particularly, to a transmission control architecture that relies on a single signal transmission interface to transmit signals of multiple transmission protocols between a master device and a sensing device.

2. Description of the Prior Art

Nowadays, digital microphones, such as digital microelectromechanical systems (MEMS) microphones, usually rely on pulse-density modulation (PDM) interfaces to transmit audio signals. The PDM interface typically has a 1-bit data channel and a clock channel for serial transmission. However, the PDM interface does not have a control channel, and cannot be used to interchange digital microphone-related control parameters. In view of this, as long as a digital microphone is shipped, its acoustic and electrical characteristics, such as sampling rate, sensitivity, acoustic overload point (AOP), or filter settings cannot be changed. In order to adjust settings of the digital microphone, it is necessary to use a transmission protocol with in-band control mechanism, such as MIPI SoundWire or HD-Audio interface, or increase signal pins. However, these approaches inevitably increase system cost and circuit complexity.

SUMMARY OF THE INVENTION

With this in mind, it is one object of the present invention to provide approaches of integrating data and control interfaces, which uses provided signal transmission interfaces for transmitting sensed information and control information in a time division multiplexing manner, thereby to configure a sensing device and read its sensed information. As such, setting/characteristic adjustment of the sensing device can be realized. Since the present invention effectively integrates different signal transmission interfaces, it will not cause a significant increase in cost.

According to one embodiment, a sensing device is provided. The sensing device comprises: a sensed information transmitting circuit, a control information slave circuit and a mode switching circuit. The sensed information transmitting circuit is configured to convert sensed information into a transmission signal compliant with a signal format of a first transmission protocol. The control information slave circuit is configured to convert a received signal received from a signal transmission interface into control information according to a second transmission protocol, thereby to configure the sensing device. The mode switching circuit is coupled to the sensed information transmitting circuit and the control information slave circuit, and configured to activate one of the sensed information transmitting circuit and the control information slave circuit based on one of a signal on a clock channel of the signal transmission interface, a signal on a data channel of the signal transmission interface or a signal on a power rail of the sensing device, thereby to transmit or receive signals through the signal transmission interface.

According to one embodiment, a master device is provided. The master device comprises: a sensed information receiving circuit, a control information master circuit and a mode switching circuit. The sensed information receiving circuit is configured to convert signal received from a signal transmission interface into sensed information according to a first transmission protocol. The control information master circuit is configured to convert control information into a transmission signal compliant with a signal format of a second transmission protocol. The mode switching circuit is coupled to the sensed information receiving circuit and the control information master circuit, and configured to adjust a signal on a clock channel of the signal transmission interface, a signal on a data channel of the signal transmission interface or a signal on a power rail of the master device according to an operation mode of the master device, thereby to control one of the sensed information receiving circuit and the control information master circuit to use the signal transmission interface for receiving or transmitting signals.

According to one embodiment a sensing system is provided. The sensing system comprises a master device and at least one sensing device. The master device comprises: a sensed information receiving circuit, a control information master circuit and a mode switching circuit. The sensed information receiving circuit is configured to convert signal received from a signal transmission interface into sensed information according to a first transmission protocol. The control information master circuit is configured to convert control information into a transmission signal compliant with a signal format of a second transmission protocol. The mode switching circuit is coupled to the sensed information receiving circuit and the control information master circuit, and configured to adjust a signal on a clock channel of the signal transmission interface, a signal on a data channel of the signal transmission interface or a signal on a power rail of the master device according to an operation mode of the master device, thereby to control one of the sensed information receiving circuit and the control information master circuit to use the signal transmission interface for receiving or transmitting signals. The sensing device comprises: a sensed information transmitting circuit, a control information slave circuit and a mode switching circuit. The sensed information transmitting circuit is configured to convert sensed information into a transmission signal compliant with a signal format of the first transmission protocol. The control information slave circuit is configured to convert a received signal received from a signal transmission interface into control information according to the second transmission protocol, thereby to configure the sensing device. The mode switching circuit is coupled to the sensed information transmitting circuit and the control information slave circuit, and configured to activate one of the sensed information transmitting circuit and the control information slave circuit based on one of a signal on a clock channel of the signal transmission interface, a signal on a data channel of the signal transmission interface or a signal on a power rail of the sensing device, thereby to transmit or receive signals through the signal transmission interface.

These and other objectives of the present invention will no doubt become obvious to those of ordinary skill in the art

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known structures, materials or steps have not been presented or described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
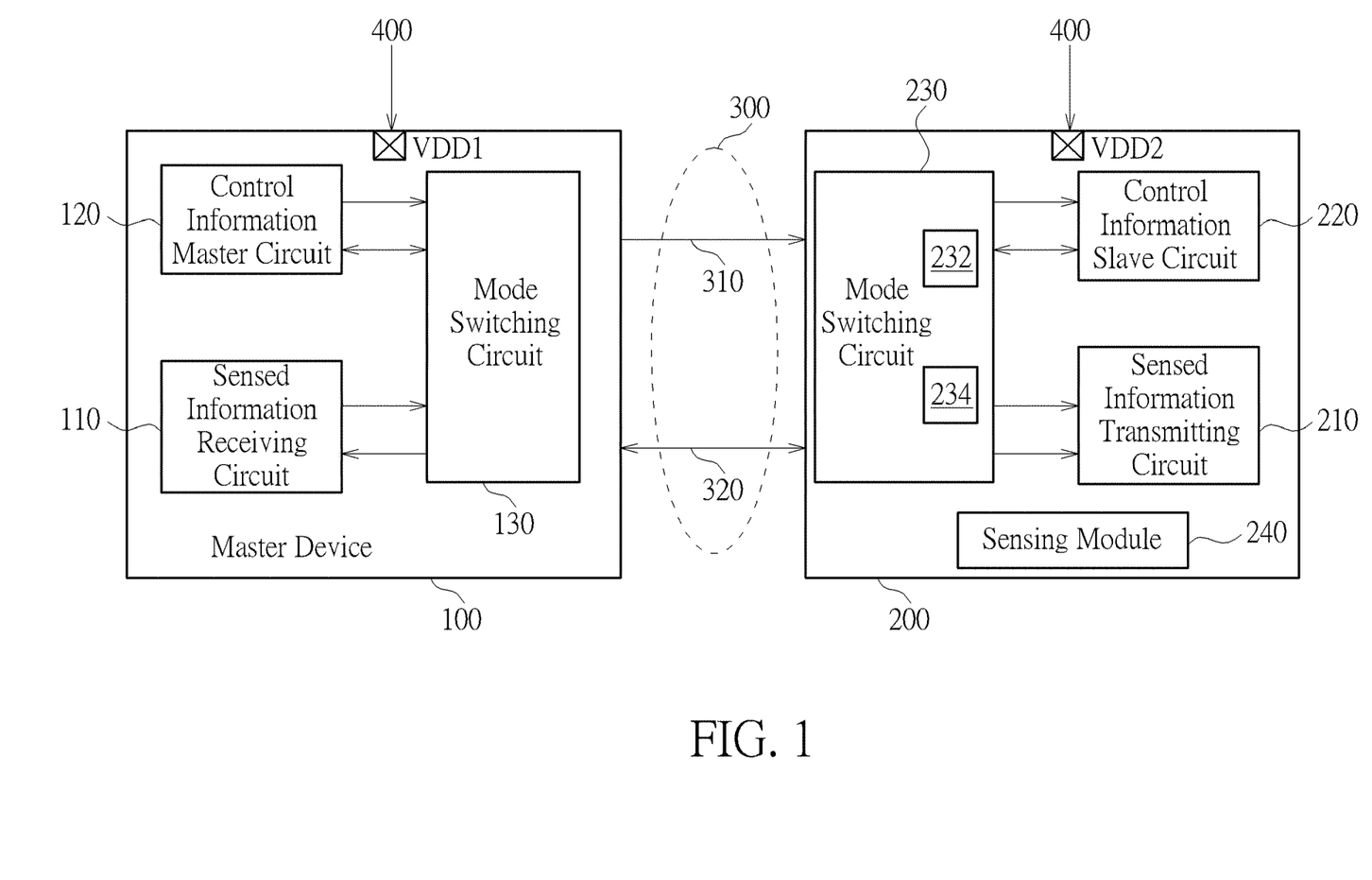
FIG. 1 illustrates a schematic diagram of a master device and a sensing device according to one embodiment of the present invention.

Please refer to FIG. 1, which illustrates a master device and a sensing device with a signal transmission interface according to one embodiment of the present invention. A master device 100 can communicate with one or more sensing devices 200 through a signal transmission system of the present invention, so as to implement setting adjustment and sensed data reading of the one or more sensing devices 200. In some embodiments, a signal transmission interface 300 comprises at least a first channel 310 and a second channel 320. The first channel 310 can be utilized to transmit a clock signal, while the second channel 320 can be utilized to transmit data signals. However, this is not a limitation of the present invention.

The master device 100 includes a sensed information receiving circuit 110, a control information master circuit 120, and a mode switching circuit 130. Based on a first transmission protocol, the sensed information receiving circuit 110 is utilized to convert signals received from the second channel 320 into specific sensed information (e.g. audio information, vibration information, pressure information, optical information or temperature information) in accordance with the clock signal on the first channel 310. In one embodiment, the first transmission protocol may be a transmission protocol based on pulse density modulation (PDM). Based on a second transmission protocol, the control information master circuit 120 is configured to send control information to the sensing device 200 through at least one of the first channel 310 and the second channel 320. The second transmission protocol may be a synchronous transmission protocol or an asynchronous transmission protocol. For example, the synchronous transmission protocol could be I²C or serial peripheral interface (SPI) protocol, while the asynchronous transmission protocol could be universal asynchronous receiver/transmitter (UART) protocol or 1-wire protocol. If the second transmission protocol is a synchronous transmission protocol, the control information master circuit 120 transmits the clock signal through the first channel 310, and transmits the control information through at least the second channel 320 (depending on the requirements of the transmission protocol, multiple non-clock channels may be needed for communication). If the second transmission protocol is an asynchronous transmission protocol, the control information master circuit 120 can send the control information through one of the first channel 310 or the second channel 320 (e.g., the 1-wire or UART single-ended transmission protocol), or both (e.g., UART differential transmission protocol). According to requirements of the master device 100, the mode switching circuit 130 can switch the sensed information receiving circuit 110 or the control information master circuit 120 to use the first channel 310 and the second channel 320. According to various embodiments of the present invention, the mode switching circuit 130 is operable to notify the sensing device 200 in advance by changing frequencies of signals on the first channel 310, characteristics of signals on the second channel 320, or voltage levels of signals on a power rail 400. When the master device 100 enters a setting adjustment mode, the control information master circuit 120 uses the signal transmission interface 300 to transmit control information. When the master device 100 enters a sensed information reading mode, the sensed information receiving circuit 110 uses the signal transmission interface 300 to receive the sensed information. In one embodiment, when the control information master circuit 120 prepares to transmit the control information to the sensing device 200 through the signal transmission interface 300, the mode switching circuit 130 may transmit a signal whose frequency lower than a threshold through the first channel 310, or increase a voltage level on the power rail 400. In this way, the sensing device 200 can determine that the transmission signal on the signal transmission interface 300 is the control information, and accordingly request a corresponding circuit module to handle the signal on the channel. On the other hand, when the sensed information receiving circuit 110 prepares to receive the sensed information through the signal transmission interface 300, the mode switching circuit 130 may transmit a signal whose frequency higher than the threshold through the first channel 310, or reduce the voltage level on the power rail 400, allowing the sensing device 200 to request a corresponding circuit module to transmit the sensed information. Please note that the approach described above is only a possible implementation of the present invention, which is suitable when a basic clock of the first transmission protocol (e.g., PDM) is higher in frequency than that of the second transmission protocol (e.g., I²C). In other embodiments, if the basic clock of the first transmission protocol is lower in frequency than that of the second transmission protocol, the approach for notifying the sensing device 200 of operation mode switching may be conversely. For example, before transmitting the control information, the mode switching circuit 130 may transmit a signal whose frequency higher than the threshold through the first channel 310, or reduce the voltage level of the signal on the power rail 400, allowing the sensing device 200 to determine the transmission signal on the interface 300 is the control information. Conversely, before receiving the sensed information, the mode switching circuit 130 may transmit a signal whose frequency lower than the threshold through the first channel 310, or increase a voltage level on the power rail 400, such that the sensing device 200 can request a corresponding circuit module to transmit the sensed information. In other words, in embodiments of the present invention, it is possible to reflect whether the master device 100 is in the setting adjustment mode or the sensed information reading mode through relationship between the frequency on the first channel 310 and the frequency threshold, or relationship between the voltage level on the power rail 400 and the voltage threshold.

In other embodiments of the present invention, the signal characteristics on the second channel 320 may be also used by the master device 100 to notify the sensing device 200 of mode switching. For example, the mode switching circuit 130 may transmit a signal with a specific pattern within a specific time interval, to the sensing device 200 through the second channel 320, thereby informing the sensing device 200 of the operation mode which the master device 100 is currently operated in. Accordingly, the sensing device 200 can respond properly. For example, the master device 100 and the sensing device 200 may pre-set or decide a protocol on encoding rules and signal patterns. When the sensing device 200 decodes a packet from the master device 100, and content of the decoded packet corresponds to a predetermined simple signal content or a series of cadence signal content (for example, but not limited to, the signal content is directed to continuous "up", "up", "down", "down", "left", "right", "left", "right", "B" and "A" (in form before being converted into binary), or a specific signal pattern such as 11011100), the sensing device 200 can determine that the transmission signal on the signal transmission interface 300 is control information, thereby to request a corresponding circuit module to handle the signal on the second channel 320.

The sensing device 200 includes a sensed information transmitting circuit 210, a control information slave circuit 220, and a mode switching circuit 230. According to the first transmission protocol, the sensed information transmitting circuit 210 is configured to convert a sensed signal generated by a sensing module 240 into a data signal on the second channel 320 based on a clock signal on the first channel 310, and the converted data signal can be transmitted to the master device 100. In one embodiment, the sensing module 240 (if the sensing device 200 is a digital microphone) may include (but is not limited to) an electroacoustic transducer, an analog-to-digital converter and a signal processing circuit. In another embodiment, the sensing module 240 (if the sensing device 200 is a temperature sensing device) may include (but is not limited to) a thermoelectric transducer, an analog-to-digital converter and a signal processing circuit. In addition, in various embodiments of the present invention, the sensing module 240 can also be a vibration sensor, a pressure sensor or an optical sensor. Furthermore, based on the second transmission protocol, the control information slave circuit 220 is configured to convert the signal received from at least one of the first channel 310 or the second channel 320 into control information, so as to conduct the setting adjustment of the sensing module 240 or other circuit elements in the sensing device 200. Specifically, setting parameters used by one or more components in the sensing module 240 or in the sensing device 200 can be adjusted in accordance with the control information. In one embodiment, these setting parameters may include (but are not limited to): sampling rate, sensitivity, gain control, acoustic overload point (AOP), or filter settings. Furthermore, the mode switching circuit 230 includes a mode detecting circuit 232 and a mode control circuit 234. The mode detecting circuit 232 can determine whether the current operating mode of the master device 100 is the setting adjustment mode or the sensed information reading mode according to the frequency of the signal on the first channel 310 or the voltage level of the signal on the power rail 400. The mode control circuit 234 controls the sensed information transmitting circuit 210 and the control information slave circuit 220 according to the determination result of the mode detecting circuit 232, thereby to allow the sensed information transmitting circuit 210 or the control information slave circuit 220, to transmit or receive signals through the signal transmission interface 300.

Figure 2:
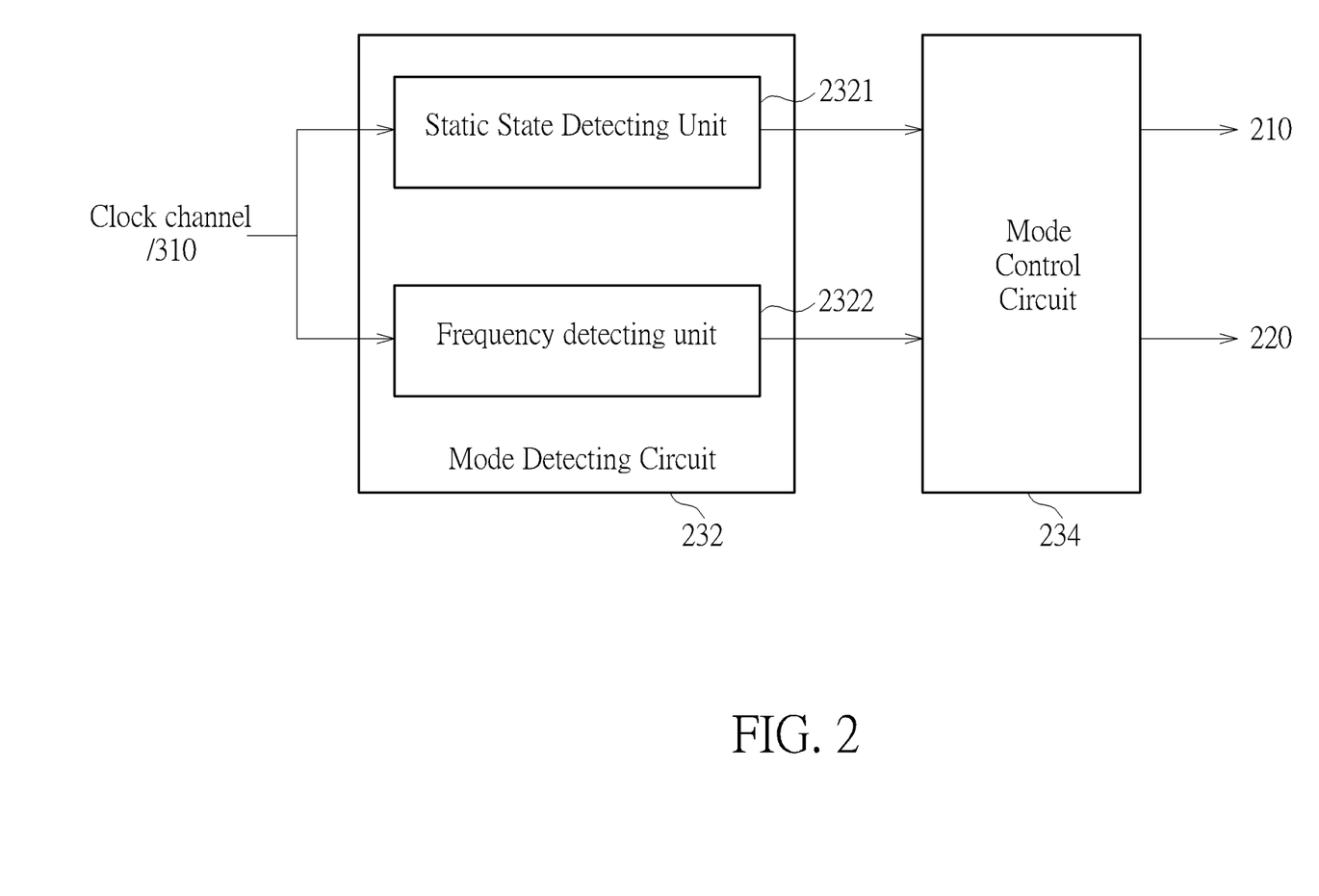
FIG. 2 illustrates a detailed structure diagram of a mode detecting circuit and a mode control circuit according to one embodiment of the present invention.
Figure 3:
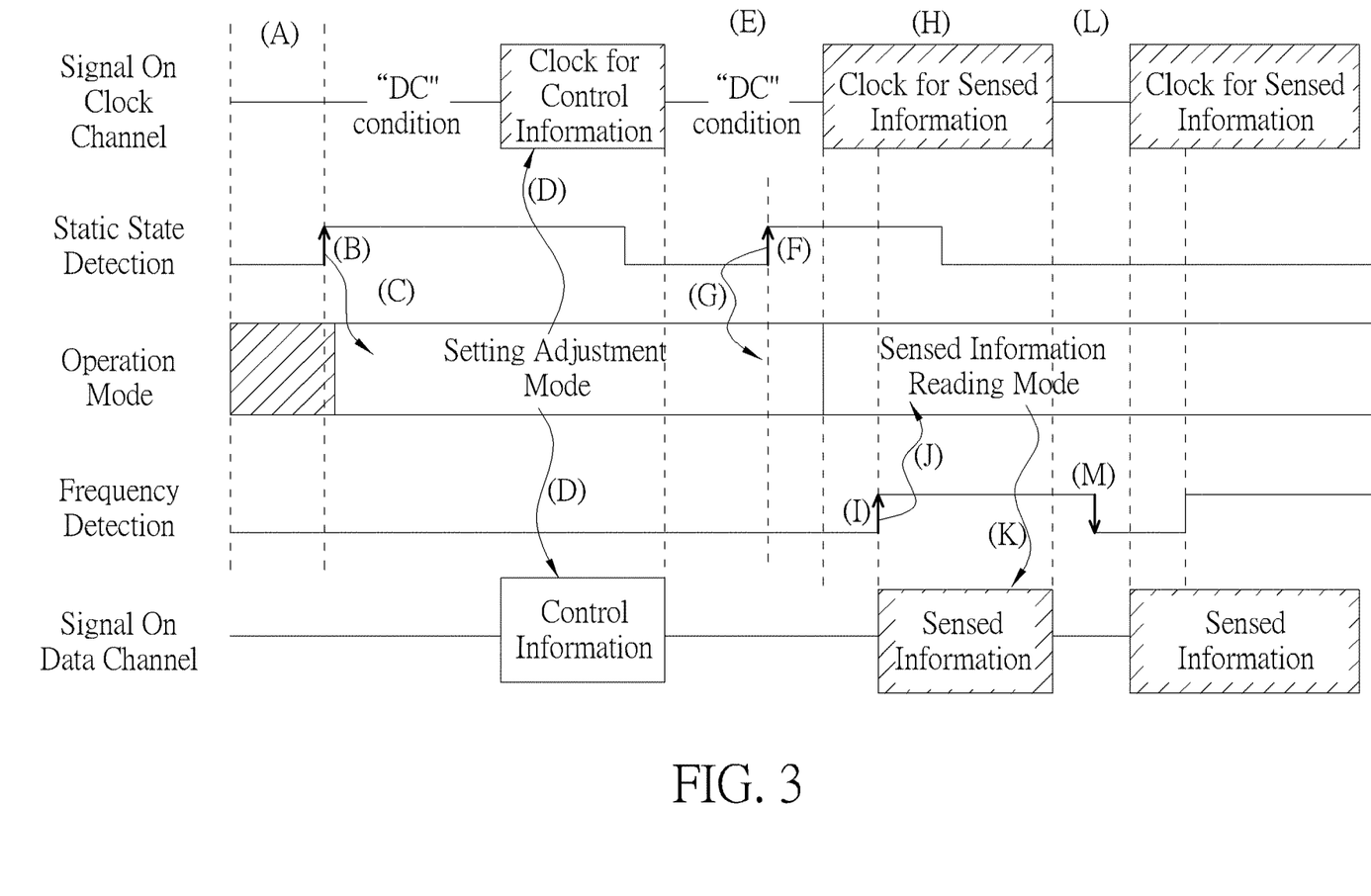
FIG. 3 illustrates a signal timing diagram according to one embodiment of the present invention.
Figure 4:
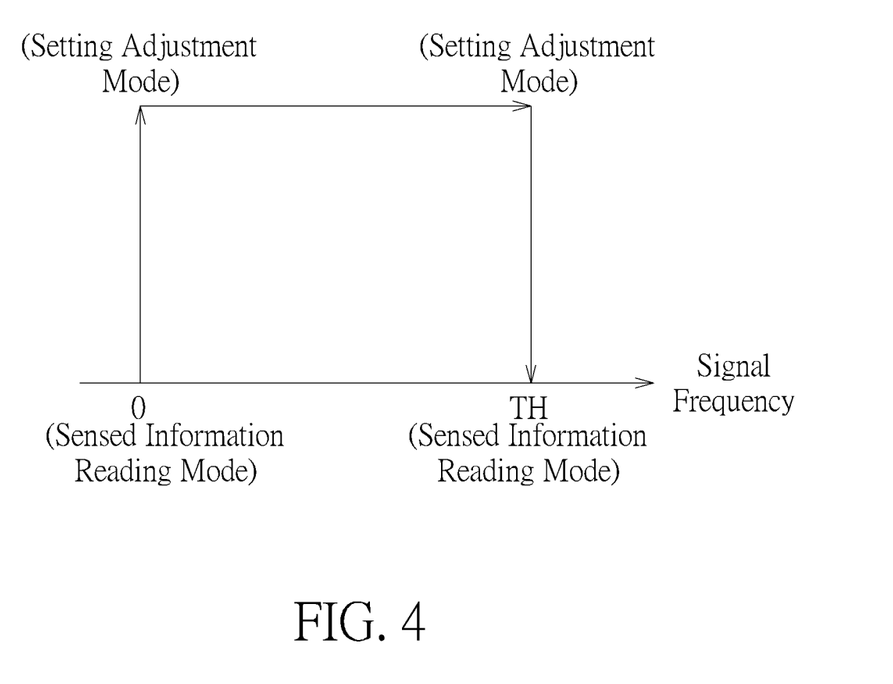
FIG. 4 illustrates a diagram of hysteresis control according to one embodiment of the present invention.

According to one embodiment of the present invention, hysteresis control technique is utilized for mode switching, so as to ensure that the sensing device 200 receives the control information transmitted by the master device 100. For further understandings, please refer to the schematic diagram shown in FIG. 2 in conjunction with a signal timing diagram shown FIG. 3. First, as shown in FIG. 2, the mode detecting circuit 232 of the sensing device 200 further comprises a static state detecting unit 2321 and a frequency detecting unit 2322. As shown in FIG. 3, before the master device 100 enters the setting adjustment mode or the sensed information reading mode, the mode switching circuit 130 is required to transmit a direct current (DC) signal through the first channel 310, where the DC signal may have logic high level or logic low level. Once the static state detecting unit 2321 detects that the signal on the first channel 310 remains direct current for a period of time (state A), it determines that the master device 100 enters the setting adjustment mode (state B), and thus the mode control circuit 234 is instructed to perform mode switching. Accordingly, the sensing device 200 enters the setting adjustment mode, allowing the control information slave circuit 220 to be activated (state C). After that, the control information master circuit 120 transmits the control information in a signal format compliant with the second transmission protocol through the first channel 310 and the second channel 320 (state D). After the control information master circuit 120 completes the transmission of the control information, the mode switching circuit 130 will again transmit the DC signal through the first channel 310 (state E). At this time, the frequency detecting unit 2322 does not detect that the frequency reaches the predetermined threshold, which leads to a hysteresis effect. Thus, it is determined that the master device 100 is still in the setting adjustment mode (state F). Accordingly, the mode control circuit 234 stays in the setting adjustment mode, which allows the control information slave circuit 220 to remain activated (state G). After that, when the master device 100 intends to start reading the sensed information, the mode control circuit 234 will instruct the sensed information receiving circuit 110 to send a clock signal compliant with the first transmission protocol through the first channel 310 (state H). The frequency detecting unit 2322 will detect that the frequency of the signal on the first channel 310 is greater than a frequency threshold TH (e.g., 400 KHz), thereby determining that the master device 100 has switched to the sensed information reading mode (State I), and further allow the mode control circuit 234 to activate the sensed information transmitting circuit 210 (State J). Then, the sensed information transmitting circuit 210 transmits the sensed information generated by the sensing module 240 to the master device 100 through the second channel 320 in a signal format compliant with the second transmission protocol (state K). However, under the sensed information reading mode, if the frequency detecting unit 2322 detects that the frequency of the signal on the first channel 310 is lower than the frequency threshold value TH (state L, state M), since the static state detecting unit 2321 does not detect the signal on the first channel 310 is direct current, the mode switching circuit 230 will not immediately allow the mode control circuit 234 to activate the control information slave circuit 220 to enter the setting adjustment mode, nor will it end the sensed information reading mode. Instead, before determining that the master device 100 enters the setting adjustment mode, it is necessary to wait until the static state detecting unit 2321 detects that the signal on the first channel 310 remains direct current, the mode control circuit 234 then activates the control information slave circuit 220. The details of the above mode switching can also be understood from a diagram shown in FIG. 4. As shown in figure, under the setting adjustment mode, the frequency needs to exceed the threshold TH before switching to the sensed information reading mode. However, once the frequency is lower than the threshold value TH, the sensed information reading mode is not switched to immediately. Instead, the sensed information reading mode will be switched to only when the frequency is zero (i.e., direct current).

Figure 5:
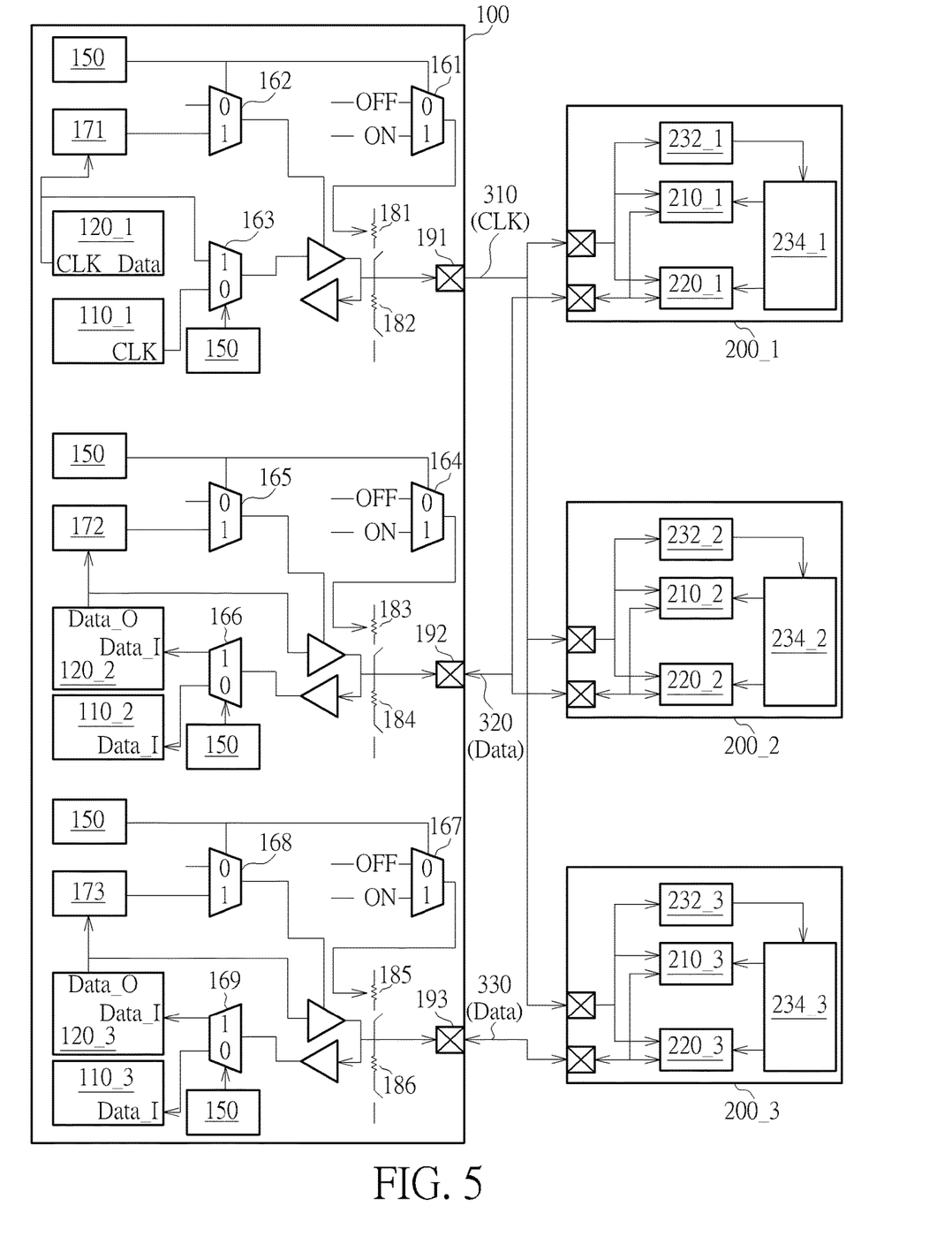
FIG. 5 illustrates a detailed structure diagram showing a master device controlling and accessing multiple sensing devices according to one embodiment of the present invention.

FIG. 5 further illustrates detailed architecture regarding a master device controlling and accessing multiple sensing devices according to one embodiment of the present invention. As shown in the figure, the master device 100 controls and accesses the sensing devices 200_1-200_3 through the first channel 310, the second channel 320, and the third channel 330. Please note that, in this embodiment, the number of sensing devices that the master device 100 is simultaneously accessible to is not a limitation of the present invention. The master device 100 typically includes a master circuit 150, one or more sensed information receiving circuits 110_1-110_3, control information master circuits 120_1-120_3, multiplexers 161-169, and logic control circuits 171-173. In this embodiment, the control information master circuits 120_1-120_3 are substantially I²C master circuits, which control the sensing devices 200_1-200_3 according to the I²C transmission protocol. In this way, multiplexers 161-162, 164-165 and 167-168 (where the multiplexers 161, 164 and 167 are labeled with "ON" or "OFF" to reflect their enablement), logic control circuits 171-173 and resistors 181-186 are configured to meet requirements of the I²C transmission protocol, which implements signal pulling-up or down on transmission channels (since I²C master circuit relies on an open-drain architecture). Accordingly, in other embodiments of the present invention, if the control information master circuits 120_1-120_3 are not I²C master circuits, the above-mentioned circuit components may be omitted.

The master circuit 150 can control the master device 100 to be switched between two operating modes: the setting adjustment mode or the sensed information reading mode. By controlling multiplexer 163, the master circuit 105 is operable to determine the clock signals (labeled as "CLK" or "CLK_Data" in the figure) either generated by the sensed information receiving circuit 110_1 or by the control information master circuit 120_1 to be transmitted to the clock channel 310 (i.e., the above-mentioned first channel 310) through the clock pad 191. In the setting adjustment mode, the multiplexer 163 allows the clock signal generated by the control information master circuit 120_1 to be transmitted to the clock channel 310 and received by the sensing devices 200_1-200_3. Meanwhile, the signals (labeled as "Data_O" in the figure) generated by the control information master circuits 120_2 and/or 120_3 can be transmitted to the data channels 320 and 330 through the data pads 192 and 193, where these data signals carrying specific control information, such as device ID and control parameters. Once the mode detecting circuits 232_1-232_3 in the sensing devices 200_1-200_3 detects that the signal on the clock channel 310 is direct current, the sensing devices 200_1-200_3 switch to the setting adjustment mode, activating the control information slave circuits (i.e., the I²C slave circuit) 220_1-220_3. These circuits can receive the signals from the data channels 320 and 330. In addition, the sensing devices 200_1-200_3 selectively adjust the setting parameters according to the device ID carried by the signals. Through the switching of the multiplexers 166 and 169, the master circuit 150 allows the control information master circuit 120_2 and/or 120_3 to receive the signals (labeled as "Data", and received as "Data_I" by the control information master circuit 120_2 and 120_3) from the data channels 320 and 330 via the data pads 192 and 193, such as, receiving parameter setting reports feedback by the sensing devices 200_1-200_3.

On the other hand, under the sensed information reading mode, the multiplexer 163 allows the clock signal generated by the sensed information receiving circuit 110_1 to be transmitted to the clock channel 310 through the clock pad 191. Accordingly, the clock signal is received by the sensing devices 200_1-200_3. The mode detecting circuits 232_1-232_3 in the sensing devices 200_1-200_3 can detect that the frequency of the signal on the clock channel 310 is greater than the threshold TH, thereby to switch to the sensed information reading mode. As such, the sensed information transmitting circuits 210_1-210_3 are activated. The sensed information transmitting circuits 210_1-210_3 report the sensed information generated by the sensing devices 200_1-200_3 to the master device 100 through the data channels 320 and 330. Meanwhile, through the switching of the multiplexers 166 and 169, the sensed information receiving circuits 110_2 and/or 110_3 can receive signals (labeled as "Data", and received as "Data_I" by sensed information receiving circuits 110_2 and 110_3) from the data channels 320 and 330 through the data pads 192 and 193, thereby acquiring the sensed information reported by the sensing device 200_1-200_3. Please note that, in this embodiment, the master device 100 may include the sensed information receiving circuits 110_1-110_3 and the control information master circuits 120_1-120_3. However, in other embodiments, a part of the sensed information receiving circuits or the control information master circuits can be integrated into a single one circuit. For example, the control information master circuits 120_1-120_3 can be integrated into one circuit, while the sensed information receiving circuits 110_1-110_3 can be integrated into two circuits.

Furthermore, although in the above embodiments, the mode detecting circuit 232 and the mode control circuit 234 in the sensing device 200 perform mode detection and switching based on the frequency of the signal on the clock channel 310. However, in other embodiments of the present invention, the mode detecting circuit 232 and the mode control circuit 234 in the sensing device 200 can also perform mode detecting and switching based on the voltage level of the signal on the power rail 400. For example, the mode switching circuit 130 in the master device 100 can increase the voltage level of the signal on the power rail 400 to 2.7V when the master circuit 150 intends to transmit the control information, or reduce the voltage level of the signal on the power rail 400 to 1.8V when the master circuit 150 intends to receive the sensed information. Accordingly, the mode detecting circuit 232 and the mode control circuit 234 in the sensing device 200 can determine when to activate the sensed information transmitting circuit 210 or the control information slave circuit 220 according to the voltage level of the signal on the power rail 400.

In summary, the present invention provides a signal transmission architecture that integrates sensed information transmission/control information transmission, which allows single signal transmission interface to support signals of multiple different transmission protocols. For example, it can support the PDM-based transmission protocol that is used to transmit sensed information, and the I²C protocol, SPI protocol, UART protocol, or 1-wire protocol that is used to transmit control information. Therefore, the present invention can control the sensing device and read the sensed information without significantly increasing hardware cost and circuit complexity, so as to realize setting/characteristic adjustment of the sensing device.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensing device, comprising:
    a sensed information transmitting circuit, configured to convert sensed information into a transmission signal compliant with a signal format of a first transmission protocol;
    a control information slave circuit, configured to convert a received signal received from a signal transmission interface into control information according to a second transmission protocol, thereby to configure the sensing device, wherein the signal transmission interface is a 2-channel interface; and
    a mode switching circuit, coupled to the sensed information transmitting circuit and the control information slave circuit, configured to activate one of the sensed information transmitting circuit and the control information slave circuit based on one of a signal on a clock channel of the signal transmission interface, a signal on a data channel of the signal transmission interface or a signal on a power rail of the sensing device, thereby to transmit or receive the transmission signal or the received signal through the signal transmission interface;
    wherein if the signal on the clock channel of the signal transmission interface reduces below a threshold in frequency and then remains direct current for a period of time, the control information slave circuit is activated to receive the received signal through the signal transmission interface to configure the sensing device; if the frequency of the signal on the clock channel of the signal transmission interface is higher than the threshold, the sensed information transmitting circuit is activated to transmit the transmission signal.

2. The sensing device of claim 1, wherein the sensing device is a digital micro-electromechanical systems (MEMS) microphone, a vibration sensor, a pressure sensor, an optical sensor or a temperature sensor; and the sensed information is audio information, vibration information, pressure information, optical information or temperature information.

3. The sensing device of claim 1, wherein the first transmission protocol is a transmission protocol based on pulse density modulation (PDM).

4. The sensing device of claim 1, wherein the second transmission protocol is an I²C protocol, a serial peripheral interface (SPI) protocol, a universal asynchronous receiver/transmitter (UART) protocol, or a single-wire (1-wire) protocol.

5. The sensing device of claim 1, wherein the mode switching circuit comprises:
    a mode detecting circuit, coupled to the clock channel or the power rail, configured to generate a detection result based on the signal on the clock channel or the signal on the power rail; and
    a mode switching circuit, coupled to the sensed information transmitting circuit, the control information slave circuit, and the mode detecting circuit, configured to activate one of the sensed information transmitting circuit and the control information slave circuit according to the detection result.

6. The sensing device of claim 5, wherein when the detection result indicates that a frequency of the signal on the clock channel is higher than a first threshold, the signal on the data channel corresponds to a specific signal characteristic, or a voltage level of the signal on the power rail is lower than a second threshold, the mode switching circuit activates the sensed information transmitting circuit; and when the detection result indicates that the frequency of the signal on the clock channel is lower than the first threshold or the voltage level of the signal on the power rail is higher than the second threshold, the mode switching circuit activates the control information slave circuit.

7. The sensing device of claim 6, wherein in a condition that the sensed information transmitting circuit is activated, the mode switching circuit activates the control information slave circuit only when the signal on the clock channel remains direct current.

8. The sensing device of claim 5, wherein the detection result is configured to indicate a frequency of the signal on the clock channel is higher or lower than a first threshold, whether decoded content of the signal on the data channel matches a specific signal characteristic, or a voltage level of the signal on the power rail is higher or lower than a second threshold, and the mode switching circuit determines to activate the sensed information transmitting circuit or the control information slave circuit according to the detection result.

9. A master device, comprising:
a sensed information receiving circuit, configured to convert a received signal received from a signal transmission interface into sensed information according to a first transmission protocol, wherein the signal transmission interface is a 2-channel interface;
a control information master circuit; configured to convert control information into a transmission signal compliant with a signal format of a second transmission protocol; and
a mode switching circuit, coupled to the sensed information receiving circuit and the control information master circuit, configured to adjust one of a signal on a clock channel of the signal transmission interface, a signal on a data channel of the signal transmission interface or a signal on a power rail of the master device according to an operation mode of the master device, thereby to control one of the sensed information receiving circuit and the control information master circuit to use the signal transmission interface for receiving or transmitting the received signal or the transmission signal;
wherein if the operation mode of the master device switches from a sensed information reading mode to a setting adjustment mode, the mode switching circuit controls the signal on the clock channel of the signal transmission interface to reduce below a threshold in frequency and then remain direct current for a period of time, allowing the control information master circuit to use the signal transmission interface for transmitting the transmission signal; and if the operation mode of the master device switches from the setting adjustment mode to the sensed information reading mode, the mode switching circuit controls the frequency of the signal on the clock channel of the signal transmission interface to be higher than the threshold, allowing the sensed information reading circuit to use the signal transmission interface for receiving the received signal.

10. The master device of claim 9, wherein the sensing device is a digital micro-electromechanical systems (MEMS) microphone, a vibration sensor, a pressure sensor, an optical sensor or a temperature sensor; and the sensed information is audio information, vibration information, pressure information, optical information or temperature information.

11. The master device of claim 9, wherein the first transmission protocol is a transmission protocol based on pulse density modulation (PDM).

12. The master device of claim 9, wherein the second transmission protocol is an I²C protocol, a serial peripheral interface (SPI) protocol, a universal asynchronous receiver/transmitter (UART) protocol, or a single-wire (1-wire) protocol.

13. The master device of claim 9, wherein before the mode switching circuit controls the sensed information receiving circuit to use the signal transmission interface for receiving the sensed information, the mode switching circuit increases a frequency of the signal on the clock channel or decreases a voltage level of the signal on the power rail; and before the mode switching circuit controls the control information master circuit to use the signal transmission interface to transmit the control information, the mode switching circuit decreases the frequency of the signal on the clock channel or increases the voltage level of the signal on the power rail.

14. The master device of claim 9, wherein before the mode switching circuit controls the control information master circuit to use the signal transmission interface to transmit the control information to a sensing device, the master device sends a signal having a specific signal characteristic to the sensing device.

15. The master device of claim 9, wherein before the mode switching circuit controls the sensed information receiving circuit or the control information master circuit to use the signal transmission interface, the mode switching circuit controls the signal on the clock channel remains direct current.

16. A sensing system, comprising:
a master device, comprising:
a sensed information receiving circuit, configured to convert a sensed information signal received from a signal transmission interface into sensed information according to a first transmission protocol, wherein the signal transmission interface is a 2-channel interface;
a control information master circuit; configured to convert control information into a control information signal compliant with a signal format of a second transmission protocol; and
a mode switching circuit, coupled to the sensed information receiving circuit and the control information master circuit, configured to adjust one of a signal on a clock channel of the signal transmission interface, a signal on a data channel of the signal transmission interface or a signal on a power rail of the master device according to an operation mode of the master device, thereby to control one of the sensed information receiving circuit and the control information master circuit to use the signal transmission interface for receiving or transmitting the sensed information signal of sensed information receiving circuit or the control information signal of the control information master circuit;
wherein if the operation mode of the master device switches from a sensed information reading mode to a setting adjustment mode, the mode switching circuit controls the signal on the clock channel of the signal transmission interface to reduce below a threshold in frequency and then remain direct current for a period of time, allowing the control information master circuit to use the signal transmission interface for transmitting the control information signal; and if the operation mode of the master device switches from the setting adjustment mode to the sensed information reading mode, the mode switching circuit controls the frequency of the signal on the clock channel of the signal transmission interface to be higher than the threshold, allowing the sensed information reading circuit to use the signal transmission interface for receiving the sensed information signal; and at least one sensing device, comprising:
  a sensed information transmitting circuit, configured to convert sensed information into the sensed information signal compliant with a signal format of the first transmission protocol;
  a control information slave circuit; configured to convert the control information signal received from the signal transmission interface into control information according to the second transmission protocol, thereby to configure the sensing device; and
  a mode switching circuit, coupled to the sensed information transmitting circuit and the control information slave circuit, configured to activate one of the sensed information transmitting circuit and the control information slave circuit based on one of a signal on a clock channel of the signal transmission interface, a signal on a data channel of the signal transmission interface or a signal on a power rail of the sensing device, thereby to transmit or receive the sensed information signal of the sensed information transmitting circuit or the control information signal of the control information slave circuit through the signal transmission interface;

wherein if the signal on the clock channel of the signal transmission interface reduces below the threshold in frequency and then remains direct current for a period of time, the control information slave circuit is activated to receive the control information signal through the signal transmission interface to configure the sensing device; if the frequency of the signal on the clock channel of the signal transmission interface is higher than the threshold, the sensed information transmitting circuit is activated to transmit the sensed information signal.

* * * * *